(12) United States Patent
Nicholson et al.

(10) Patent No.: US 9,323,739 B2
(45) Date of Patent: Apr. 26, 2016

(54) IDENTIFYING WORDS FOR A CONTEXT (71) Applicant: LENOVO (Singapore) PTE, LTD., New Tech Park (SG)

(72) Inventors: John Weldon Nicholson, Cary, NC (US); Robert A. Bowser, Cary, NC (US); John Miles Hunt, Raleigh, NC (US); Jian Li, Chapel Hill, NC (US); Matthew Price Roper, Raleigh, NC (US); Jianbang Zhang, Raleigh, NC (US)

(73) Assignee: Lenovo (Singapore) PTE. LTD., New Tech Park (SG)

( * ) Notice: Subject to any disclaimer, the term of this patent is extended or adjusted under 35 U.S.C. 154(b) by 298 days.

(21) Appl. No.: 13/777,031

(22) Filed: Feb. 26, 2013

(65) Prior Publication Data

US 2014/0244239 A1 Aug. 28, 2014

(51) Int. Cl.
*G06F 17/27* (2006.01)

(52) U.S. Cl.
CPC ........ *G06F 17/2735* (2013.01); *G06F 17/2765* (2013.01)

(58) Field of Classification Search
None
See application file for complete search history.

(56) References Cited

U.S. PATENT DOCUMENTS

| | | | | |
|---|---|---|---|---|
| 2006/0100856 | A1* | 5/2006 | Kang et al. | 704/9 |
| 2010/0063796 | A1* | 3/2010 | Rehberg et al. | 704/9 |
| 2011/0197128 | A1* | 8/2011 | Assadollahi | 715/259 |

* cited by examiner

*Primary Examiner* — Jeremiah Bryar
(74) *Attorney, Agent, or Firm* — Kunzler Law Group (57) ABSTRACT

For identifying words for a context, a monitor module monitors first communications at a digital processing system and determines usage frequencies of a plurality of words in one or more contexts. An identity module identifies a first word in response to a usage frequency for the first word exceeding a use threshold.

11 Claims, 8 Drawing Sheets

IDENTIFYING WORDS FOR A CONTEXT

FIELD

The subject matter disclosed herein relates to identifying words and more particularly relates to identifying words for a context.

BACKGROUND

Description of the Related Art

Data Processing Systems (DPS) often recognize words and phrases, referred to hereafter as words, during communications. The recognized words may be inserted into text, used to correct spelling, and the like.

BRIEF SUMMARY

Based on the foregoing discussion, the inventors have recognized a need for an apparatus, method, and program product that identifies words for a context. The apparatus includes a computer readable storage medium storing machine readable code and a processor executing the machine readable code. The machine readable code includes a monitor module and an identity module. The monitor module monitors first communications at a digital processing system and determines usage frequencies of a plurality of words in one or more contexts. The identity module identifies a first word in response to a usage frequency for the first word exceeding a use threshold. The method and program product also perform the functions of the apparatus.

Furthermore, the described features, advantages, and characteristics of the embodiments may be combined in any suitable manner. One skilled in the relevant art will recognize that the embodiments may be practiced without one or more of the specific features or advantages of a particular embodiment. In other instances, additional features and advantages may be recognized in certain embodiments that may not be present in all embodiments.

These features and advantages of the embodiments will become more fully apparent from the following description and appended claims, or may be learned by the practice of the embodiments as set forth hereinafter.

BRIEF DESCRIPTION OF THE DRAWINGS

A more particular description of the embodiments briefly described above will be rendered by reference to specific embodiments that are illustrated in the appended drawings. Understanding that these drawings depict only some embodiments and are not therefore to be considered to be limiting of scope, the embodiments will be described and explained with additional specificity and detail through the use of the accompanying drawings, in which.

DETAILED DESCRIPTION

As will be appreciated by one skilled in the art, aspects of the embodiments may be embodied as a system, method or program product. Accordingly, embodiments may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, embodiments may take the form of a program product embodied in one or more computer readable storage devices storing machine readable code. The storage devices may be tangible, non-transitory, and/or non-transmission.

Many of the functional units described in this specification have been labeled as modules, in order to more particularly emphasize their implementation independence. For example, a module may be implemented as a hardware circuit comprising custom VLSI circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be implemented in machine readable code and/or software for execution by various types of processors. An identified module of machine readable code may, for instance, comprise one or more physical or logical blocks of executable code which may, for instance, be organized as an object, procedure, or function. Nevertheless, the executables of an identified module need not be physically located together, but may comprise disparate instructions stored in different locations which, when joined logically together, comprise the module and achieve the stated purpose for the module.

Indeed, a module of machine readable code may be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different computer readable storage devices, and may exist, at least partially, merely as electronic signals on a system or network. Where a module or portions of a module are implemented in software, the software portions are stored on one or more machine readable storage devices.

Any combination of one or more computer readable medium may be utilized. The computer readable medium may be a machine readable signal medium or a machine readable storage medium such as a computer readable storage medium. The machine readable storage medium may be a storage device storing the machine readable code. The storage device may be, for example, but not limited to, an electronic, magnetic, optical, electromagnetic, infrared, holographic, micromechanical, or semiconductor system, apparatus, or device, or any suitable combination of the foregoing.

More specific examples (a non-exhaustive list) of the storage device would include the following: an electrical connection having one or more wires, a portable computer diskette, a hard disk, a random access memory (RAM), a read-only memory (ROM), an erasable programmable read-only memory (EPROM or Flash memory), a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A machine readable signal medium may include a propagated data signal with machine readable code embodied therein, for example, in baseband or as part of a carrier wave. Such a propagated signal may take any of a variety of forms, including, but not limited to, electro-magnetic, optical, or any suitable combination thereof. A machine readable signal medium may be any storage device that is not a computer readable storage medium and that can communicate, propagate, or transport a program for use by or in connection with an instruction execution system, apparatus, or device. Machine readable code embodied on a storage device may be transmitted using any appropriate medium, including but not limited to wireless, wireline, optical fiber cable, Radio Frequency (RF), etc., or any suitable combination of the foregoing.

Machine readable code for carrying out operations for embodiments may be written in any combination of one or more programming languages, including an object oriented programming language such as Java, Smalltalk, C++ or the like and conventional procedural programming languages, such as the "C" programming language or similar programming languages. The machine readable code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Reference throughout this specification to "one embodiment," "an embodiment," or similar language means that a particular feature, structure, or characteristic described in connection with the embodiment is included in at least one embodiment. Thus, appearances of the phrases "in one embodiment," "in an embodiment," and similar language throughout this specification may, but do not necessarily, all refer to the same embodiment, but mean "one or more but not all embodiments" unless expressly specified otherwise. The terms "including," "comprising," "having," and variations thereof mean "including but not limited to," unless expressly specified otherwise. An enumerated listing of items does not imply that any or all of the items are mutually exclusive, unless expressly specified otherwise. The terms "a," "an," and "the" also refer to "one or more" unless expressly specified otherwise.

Furthermore, the described features, structures, or characteristics of the embodiments may be combined in any suitable manner. In the following description, numerous specific details are provided, such as examples of programming, software modules, user selections, network transactions, database queries, database structures, hardware modules, hardware circuits, hardware chips, etc., to provide a thorough understanding of embodiments. One skilled in the relevant art will recognize, however, that embodiments may be practiced without one or more of the specific details, or with other methods, components, materials, and so forth. In other instances, well-known structures, materials, or operations are not shown or described in detail to avoid obscuring aspects of an embodiment.

Aspects of the embodiments are described below with reference to schematic flowchart diagrams and/or schematic block diagrams of methods, apparatuses, systems, and program products according to embodiments. It will be understood that each block of the schematic flowchart diagrams and/or schematic block diagrams, and combinations of blocks in the schematic flowchart diagrams and/or schematic block diagrams, can be implemented by machine readable code. These machine readable code may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the schematic flowchart diagrams and/or schematic block diagrams block or blocks.

The machine readable code may also be stored in a storage device that can direct a computer, other programmable data processing apparatus, or other devices to function in a particular manner, such that the instructions stored in the storage device produce an article of manufacture including instructions which implement the function/act specified in the schematic flowchart diagrams and/or schematic block diagrams block or blocks.

The machine readable code may also be loaded onto a computer, other programmable data processing apparatus, or other devices to cause a series of operational steps to be performed on the computer, other programmable apparatus or other devices to produce a computer implemented process such that the program code which execute on the computer or other programmable apparatus provide processes for implementing the functions/acts specified in the flowchart and/or block diagram block or blocks.

The schematic flowchart diagrams and/or schematic block diagrams in the Figures illustrate the architecture, functionality, and operation of possible implementations of apparatuses, systems, methods and program products according to various embodiments. In this regard, each block in the schematic flowchart diagrams and/or schematic block diagrams may represent a module, segment, or portion of code, which comprises one or more executable instructions of the program code for implementing the specified logical function(s).

It should also be noted that, in some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. Other steps and methods may be conceived that are equivalent in function, logic, or effect to one or more blocks, or portions thereof, of the illustrated Figures.

Although various arrow types and line types may be employed in the flowchart and/or block diagrams, they are understood not to limit the scope of the corresponding embodiments. Indeed, some arrows or other connectors may be used to indicate only the logical flow of the depicted embodiment. For instance, an arrow may indicate a waiting or monitoring period of unspecified duration between enumerated steps of the depicted embodiment. It will also be noted that each block of the block diagrams and/or flowchart diagrams, and combinations of blocks in the block diagrams and/or flowchart diagrams, can be implemented by special purpose hardware-based systems that perform the specified functions or acts, or combinations of special purpose hardware and machine readable code.

Descriptions of figures may refer to elements described in previous figures, like numbers referring to like elements.

Figure 1:
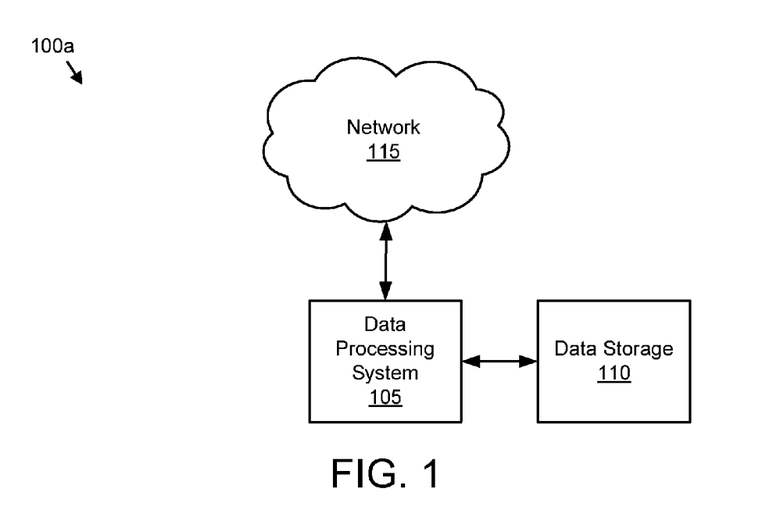
FIG. 1 is a schematic block diagram illustrating one embodiment of a communications system.

FIG. 1 is a schematic block diagram illustrating one embodiment of a communications system 100a. The system 100a includes a DPS 105, data storage 110, and a network 115. The data storage 110 may be integrated in the DPS 105. Alternatively, the data storage 110 may be external to the DPS 105. The DPS 105 may store documents in the data storage 110. Communications of the DPS 105 may include viewing the documents stored in the data storage 110.

The network 115 maybe the Internet, a wide area network, a local area network, a mobile telephone network, a wired telephone network, or the like. The DPS 105 may communicate with other devices over the network 115. For example, the DPS 105 may communicate text messages, voice communications, video communications, email communications, and the like over the network 115.

During these communications, words may be recognized by one or more dictionaries. The recognized words may be inserted into the communications. For example, a recognized word may be inserted into a text communication or a document. In one embodiment, spelling corrections for the recognized word may be presented to a user.

The communications through the DPS 105 may each have one or more contexts. For example, the context may be the person or persons with which the DPS 105 is communicating, referred to hereafter as the target audience. The target audience may also include categories of persons. In addition, the target audience may be persons, categories of persons, or combinations thereof.

Alternatively, the context of the communications may be a subject. For example, the subject may be a professional subject, a personal subject, an interest such as a hobby or local sports team, and the like. Alternatively, the subject may include topics of a subject such as topics within the professional subject.

In one embodiment, the context of the communications is location dependent. For example, the context of communications in London is different from the context of similar communications in Tokyo. In addition, the location may include a time, such as a specific time, a time interval, and the like. In one embodiment, the time interval is a day, a week, a month, a quarter, a season, and the like.

The embodiments described herein determine usage frequencies for words in one or more contexts. Words with usage frequencies that exceed a use threshold are identified as will be described hereafter. The identified words may then be inserted into a communication such as a text message. Alternatively, the identified words may be added to a dictionary. The identified words may then be used to correct spelling and/or anticipate a word that will be included in a communication.

Figure 2:
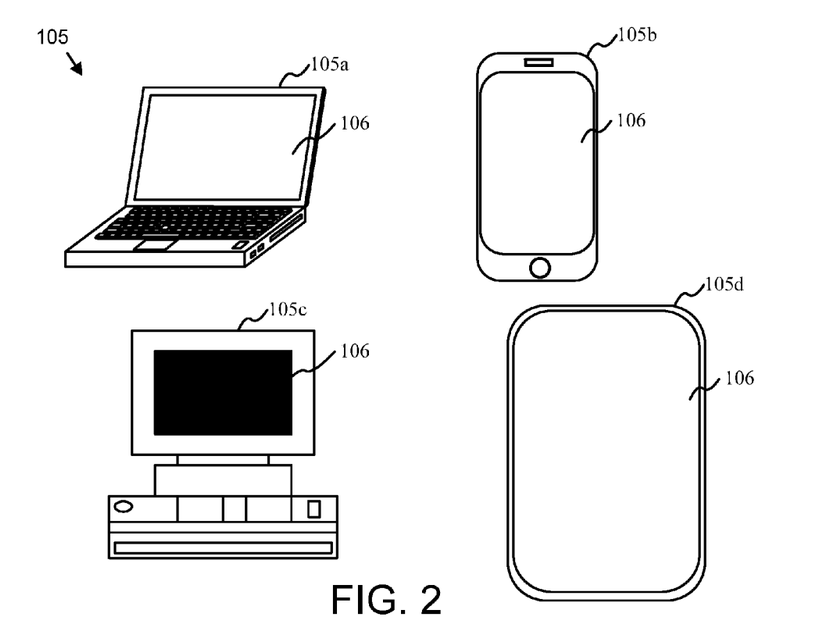
FIG. 2 shows drawings of embodiments of DPS.

FIG. 2 shows drawings of embodiments of DPS 105. The DPS 105 may be a laptop computer 105a, a mobile telephone 105b, a computer workstation 105c, or a tablet computer 105d. Alternatively, the DPS 105 may be a wearable computer, a personal digital assistant, and embedded computer, or the like. Each DPS 105 may include a display 106.

Figure 3:
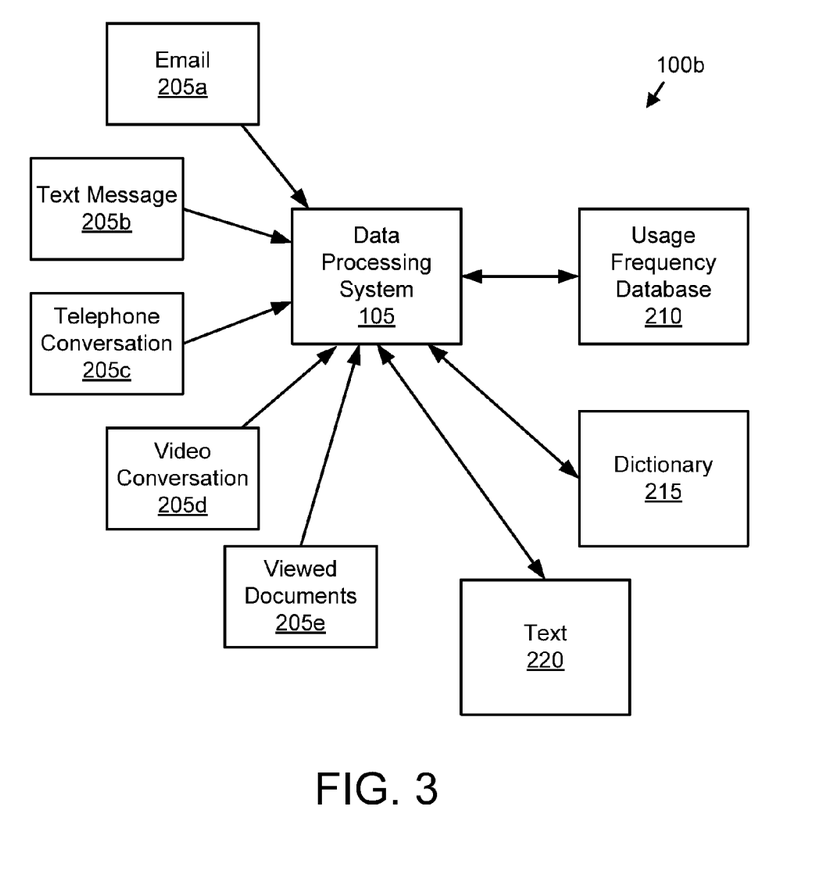
FIG. 3 is a schematic block diagram illustrating one alternate embodiment of a communications system.

FIG. 3 is a schematic block diagram illustrating one alternate embodiment of a communications system 100b. The communication system 100b may be embodied in the communication system 100a a FIG. 1. The communication system 100b include one or more communications 205 such as an email 205a, a text message 205b a telephone conversation 205c, a video conversation 205d, a viewed document 205e, and the like. The DPS 105 may monitor the communications 205. The email 205a, text message 205b, video conversation 205d, and viewed document 205e may be viewed through the display 106.

The DPS 105 may further record usage frequencies for words of the monitored communications 205 in a usage frequency database 210. The DPS 105 may also determine the contexts for the communications 205 and determine the usage frequencies for the contexts.

If the usage frequency for a first word exceeds the use threshold, the DPS 105 may identify the first word. In addition, the DPS 105 may add the first word to a dictionary 215. Alternatively, the DPS 105 may insert the first word in text 220 as will be described hereafter.

Figure 4:
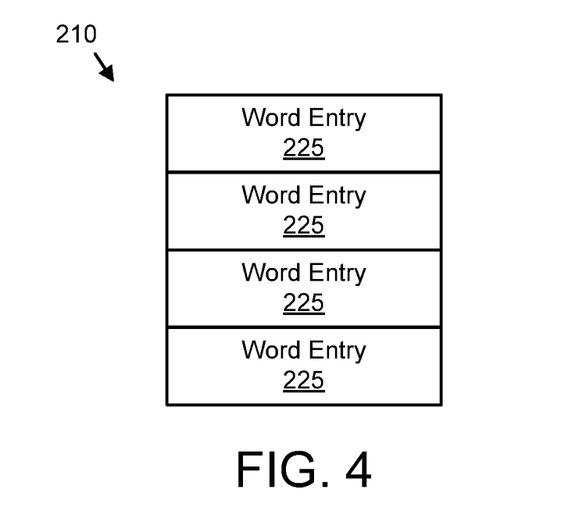
FIG. 4 is a schematic block diagram illustrating one embodiment of a usage frequency database.

FIG. 4 is a schematic block diagram illustrating one embodiment of the usage frequency database 210. The database 210 may be the database 210 of FIG. 1. The database 210 includes a plurality of word entries 225. The word entries 225 may be structured as database rows, linked data structures, a flat file, or the like.

In one embodiment, the DPS 105 records a word entry 225 for each instance of a word in communications. Alternatively, the DPS 105 records a word entry 225 for each word, with a word entry 225 recording a total number of instances of use of the word.

Figure 5:
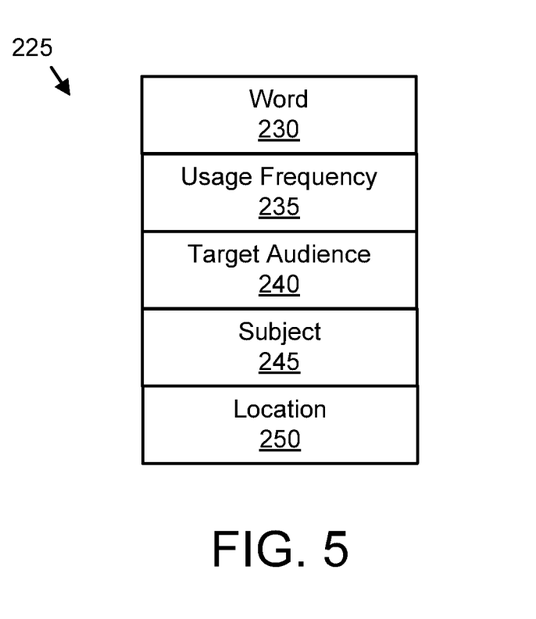
FIG. 5 is a schematic block diagram illustrating one embodiment of a word entry.

FIG. 5 is a schematic block diagram illustrating one embodiment of a word entry 225. The word entry 225 may be the word entry 225 of FIG. 4. The word entry 225 includes the word 230, the usage frequency 235, a target audience 240, a subject 245, and a location 250. One of skill in the art will recognize that embodiments may be practiced by recording other data related to the word 230.

The usage frequency 235 may indicate a single instance of the word 230 used in a communication 205. Alternatively, the usage frequency 235 may accumulate a sum of instances of the word 230 used in the communication 205. In one embodiment, the usage frequency 235 is a sum of instances of the word 230 used in a plurality of communications 205.

In one embodiment, the usage frequency 235 comprises a sum of instances of the word 230 used in communications 205 for a plurality of other DPS 105 associated with the DPS 105. For example, the usage frequency 235 may receive and include instances of the word 230 used by the DPS 105 of colleagues of a user, the DPS 10f of friends of the user, the DPS 105 of influencers of the user such as content producers for the user, and the like. Thus the usage frequencies 235 of the words 230 used by those associating with the user will also be used to identify the word 230.

The target audience 240 may record the name of an individual to which communication 205 that included the word 230 was directed. For example, the target audience 240 may be a specific name. Alternatively, the target audience 240 is a category of person. The categories may include colleague, customer, supplier, spouse, friend, acquaintance, media, regulator, service provider, and the like.

The target audience 240 may be determined from a communication address. For example, an email communication 205a to a client may be parsed to identify the specific recipient, with the recipient's name recorded as the target audience 240. In addition, the organization of the recipient may also be parsed from the email address and used to identify the category of the recipient as a client. If the word entry 225 tracks uses of the word 230 for a plurality of instances, the target audience 240 may be recorded for each instance of use of the word 230.

The subject 245 may be a field such as technology, medicine, law, marketing, finance, and the like. The subject 245 may also be a topic within a field such as tablet computers, heart bypass operations, market penetration, and return on investment. In one embodiment, the subject 245 includes both a field and a topic. If the word entry 225 tracks uses of the word 230 for a plurality of instances, the subject 245 may be recorded for each instance of use of the word 230.

The location 250 may record the location of the DPS 105. For example, the location 250 may record the DPS 105 is communicating from Beijing. Alternatively, the location 250 may record the location of the destination of the communications. For example, if the DPS 105 is communicated through the network 115 to another DPS 105 in London, the location 205 may record London as the location. In one embodiment, the location 250 records both the source and the destination of the communications.

In addition, the location 250 may include historical, associative, and/or biographical locations for the user of the DPS 105. For example, the location 250 may include a historical location of the user such as a home state, a home town, a university town, a current state, a current city, or the like. For example, the home state may be Florida and the current state may be North Carolina. Alternatively, the location 250 may include associative locations of organizations associated with the user, such as an employer's headquarters city, a client city, a location of vacation property, and the like. In addition, the location 250 may be a biographical location of persons associated with the user, such as a spouse's home city, a friend's current city, a parent's current city, or the like.

In one embodiment, the location 250 includes a time of the communication. Alternatively, the location to a 50 may include a time interval. Examples of time intervals may include work hours, after work hours, the times of regularly scheduled meetings, and the like. If the word entry 225 tracks uses of the word 230 for a plurality of instances, the location 250 may be recorded for each instance of use of the word 230.

Figure 6:
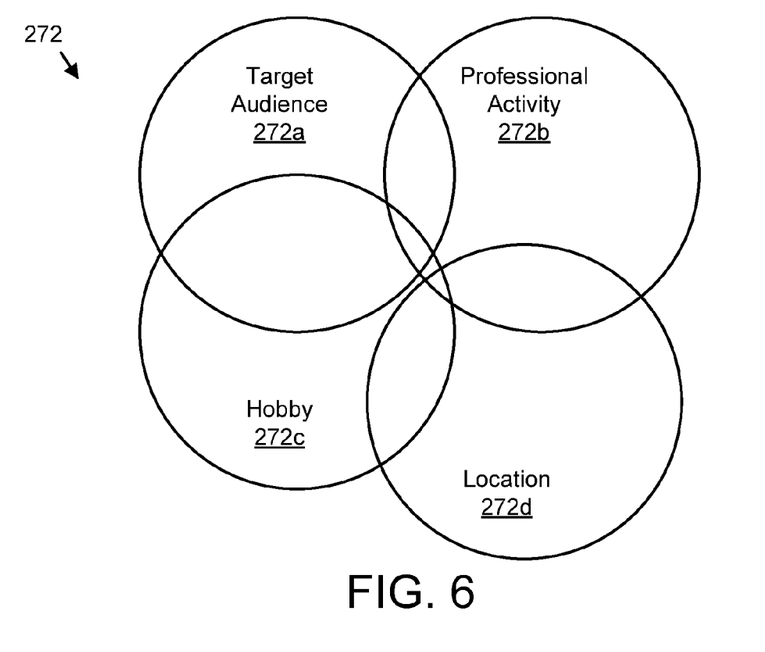
FIG. 6 is a schematic block diagram illustrating one embodiment of sub-dictionaries.

FIG. 6 is a schematic block diagram illustrating one embodiment of sub-dictionaries 272. Each sub-dictionary 272 corresponds to a least one of a target audience 240, a subject 245, and a location 250, or combinations thereof. In one embodiment, the sub-dictionary 272 is created for each combination of target audience 240, subject 245, and location 250. In an alternate embodiment, the sub-dictionaries 272 may be user specified. In the depicted embodiment, the sub-dictionaries 272 include a target audience sub-dictionary 272a, a professional activity sub-dictionary 272b, a hobby sub-dictionary 272c, and a location sub-dictionary 272d. One of skill in the art will recognize of the embodiments may be practiced with any number of sub-dictionaries 272.

Figure 7:
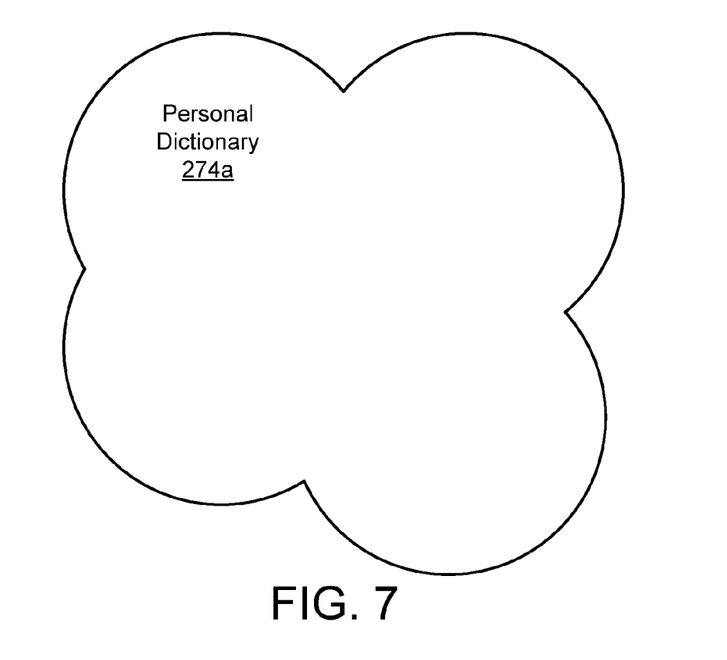
FIG. 7 is a schematic block diagram illustrating one embodiment of a personal dictionary.

FIG. 7 is a schematic block diagram illustrating one embodiment of a personal dictionary 274. In one embodiment, the union of the sub-dictionary 272 forms the personal dictionary 274. A personal dictionary 274 may be used as a unified dictionary, wherein the words 230 of each sub-dictionary 272 are combined. Alternatively, one or more sub-dictionaries 272 of the personal dictionary 274 may be employed.

Figure 8:
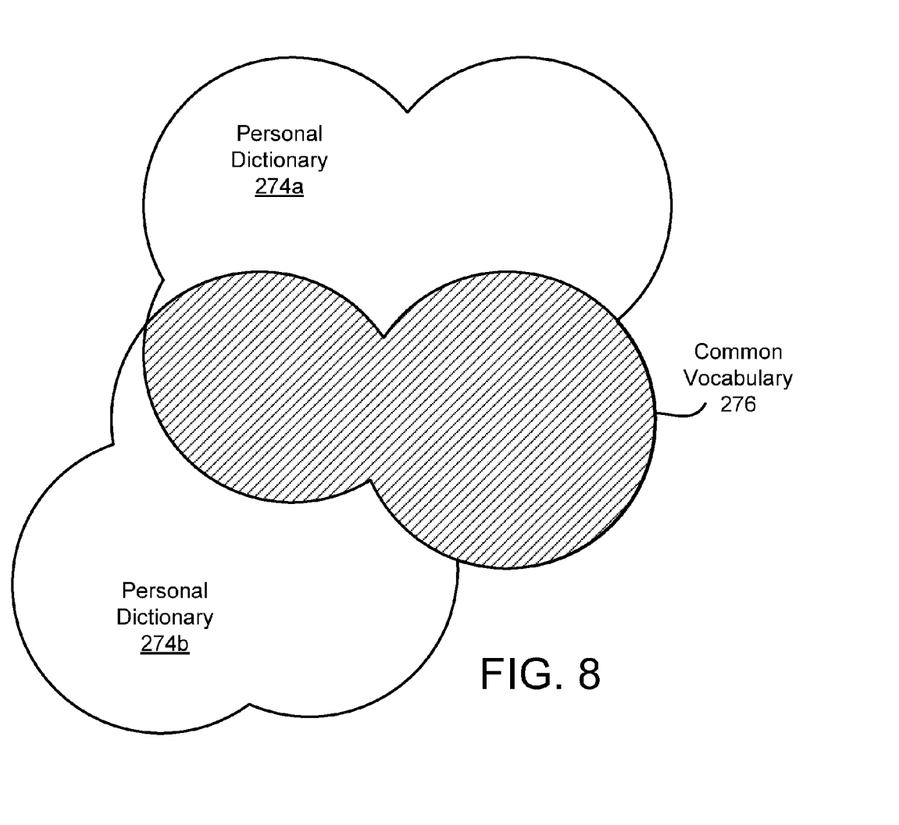
FIG. 8 is a schematic block diagram illustrating one embodiment of personal directories.

FIG. 8 is a schematic block diagram illustrating one embodiment of personal dictionaries 274. Either a first personal dictionary 274a or the second personal dictionary 274b may be the personal dictionary 274 of FIG. 7. The first personal dictionary 274a may be associated with the DPS 105. The second personal dictionary 274b may be associated with a second device in communication with the DPS 105. In one embodiment, during a communication between the DPS 105 and the second device, a common vocabulary 276 may be used in place of the personal dictionaries 274 the DPS 105 and the second device. In one embodiment, the common vocabulary 276 includes words 230 that are common to both personal dictionaries 274, such as the logical intersection of the first and second personal dictionaries. 274a-b.

Figure 9:
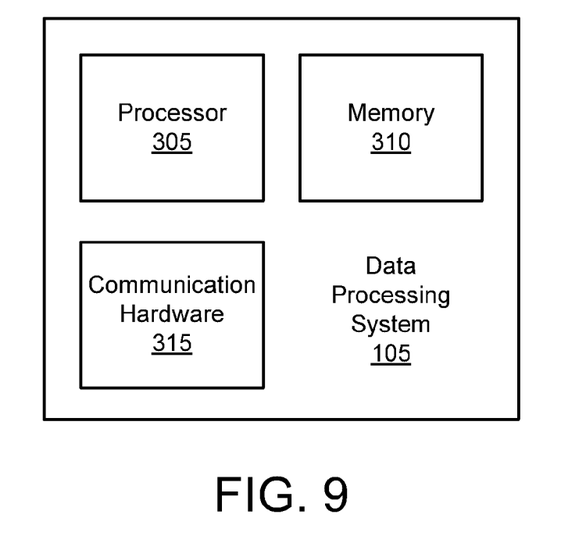
FIG. 9 is a schematic block diagram illustrating one embodiment of a DPS.

FIG. 9 is a schematic block diagram illustrating one embodiment of a DPS 105. The DPS 105 may include a processor 305, a memory 310, and communication hardware 315. The memory 310 may be a computer readable storage medium such as a semiconductor storage device, a hard disk drive, an optical storage device, a holographic storage device, a micromechanical storage device, or the combinations thereof. The memory 310 may store machine readable code. The processor 305 may execute the machine readable code. The communication hardware 315 may communicate with other devices.

Figure 10:
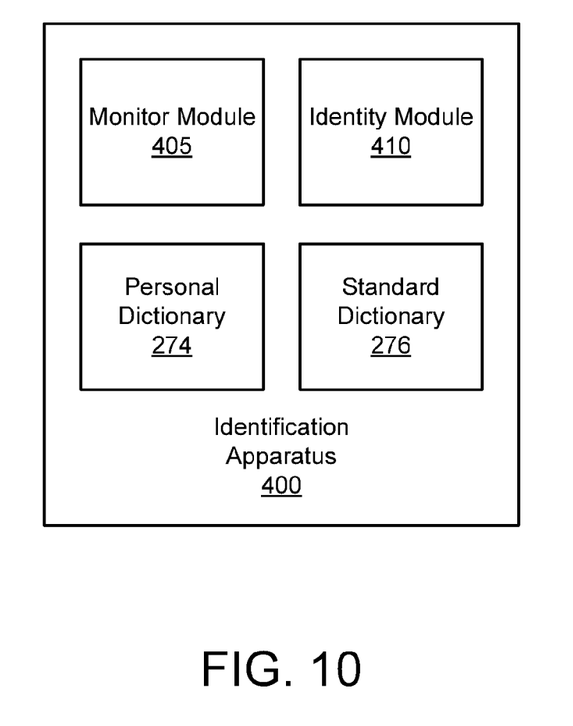
FIG. 10 is a schematic block diagram illustrating one embodiment of an identification apparatus.

FIG. 10 is a schematic block diagram illustrating one embodiment of an identification apparatus 400. The apparatus 400 may be embodied in the DPS 105. The apparatus 400 includes a monitor module 405 and an identity module 410. In addition, the apparatus 400 may include the personal dictionary 274 and a standard dictionary 276. The monitor module 405, identity module 410, personal dictionary 274, and standard dictionary 276 may be embodied in a computer readable storage medium such as the memory 310. The computer readable storage medium may store machine executable code that when executed by the processor 305 perform the functions of the apparatus 400.

In one embodiment, the monitor module 405 monitors first communications at the DPS 105 and determines usage frequencies 235 of a plurality of words 230 in one or more contexts. The identity module 410 may identify the first word of the plurality of words in response to a usage frequency for the first word exceeding a use threshold.

Personal dictionary 274 may be the personal dictionary 274 of FIG. 7. The standard dictionary 276 may be an operating system dictionary, an application dictionary, or the like. The standard dictionary 276 is typically not tailored to the vocabulary used at the DPS 105. The personal dictionary 274 records words that are frequently used at the DPS 105 so that those words may be inserted into text or used to spell check communications 205 and documents of the DPS 105.

Figure 11:
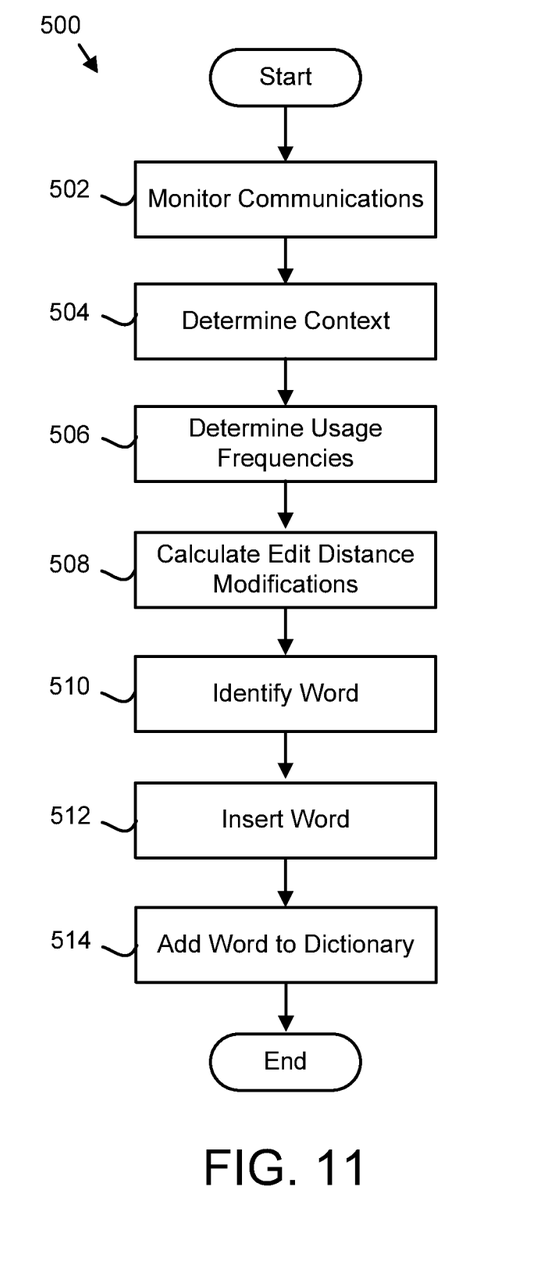
FIG. 11 is a schematic flow chart diagram illustrating one embodiment of an identification method.

FIG. 11 is a schematic flow chart diagram illustrating one embodiment of an identification method 500. The method 500 may perform the functions of the system 100 and apparatus 400. In one embodiment, the method 500 is performed by use of the processor 305. Alternatively, the method 500 may be embodied in a program product comprising a computer readable storage medium storing machine readable code executed by the processor 305 to perform the functions of the method 500.

The method 500 starts, and in one embodiment a monitor module 405 monitors 502 communications 205 at the DPS 105. In one embodiment, the monitor module 405 monitors 502 inputs from an input device such as a keyboard, voice recognition software, handwriting recognition software, or the like. For example, the monitor module 405 may monitor 502 the text input from a keyboard for an email 205a.

Alternatively, the monitor module 405 may scan a communication 205 such as an email 205a, a text message 205b, a telephone conversation 205c, a video conversation 205d, a viewed document 205e, or the like. In one embodiment, the monitor module 405 may scan the communication 205 each time the communication 205 is saved. Alternatively, the monitor module 405 may scan the communication 205 when the communication 205 is transmitted.

In a certain embodiment, the monitor module 405 scans communications 205 that are received at the DPS 105. For example, the monitor module 405 may also scan all incoming emails 205a, text messages 205b, voicemail messages, documents, and the like.

The monitor module 405 may determine 504 a context for each communication. The context may include at least one of the target audience 240, the subject 245, and the location 250. The context may be recorded in the word entry 225 for the word 230 as the target audience 240, the subject 245, and the location 250.

The monitor module 405 may determine 504 the target audience 240 from an address for the communication 205. The address may be a telephone number, an email address, and instant messaging address, and the like. The monitor module 405 may determine 504 one or more specific persons as the target audience 240. The monitor module 405 may also determine 504 a category of the specific persons. In one embodiment, the monitor module 405 consults a customer management system to determine the category of the specific persons. Alternatively, the monitor module 405 may prompt the user to identify the category of the specific persons. In one embodiment, after an organizational identifier such as the main part of an email address, an area code, a phone number, or the like is identified for a first person, the category of the first person may be applied to other specific persons with the organizational identifier.

In an alternate embodiment, if the plurality of addresses for a plurality of specific persons are included in a communication, and the category for a first specific person included in the communication is known, that category may be applied to all persons included in the communication. In one embodiment, each specific person may be included in a plurality of categories. Alternatively, each specific person may be included in only one category.

The monitor module 405 may determine 506 the usage frequencies 235 of the plurality of words in the communications 205 in one or more contexts. In one embodiment, the one or more contexts are user created. Alternatively, the monitor module 405 may create a unique context for each combination of the target audience 240, the subject 245, and the location 250. For example, the monitor module 405 may determine 506 the usage frequencies for the combination of the target audience 240 being a spouse, the subject 245 being "day care," and the location 250 being the user's office. In one embodiment, if a context has fewer words 230 than a context threshold, the context may be combined with a second context.

In one embodiment, the monitor module 405 may store the usage frequencies 235 for each context. Alternatively, a monitor module 405 may calculate 235 the usage frequencies 235 as needed from the usage frequency data base 210. In a certain embodiment, the monitor module 405 receives the usage frequencies 235 for the word 230 in one or more contexts from other DPS 105, such as the DPS 105 of colleagues, friends, and influencers of the user. The received usage frequencies 235 may be weighted according the interaction of the other DOS 105 with the DPS 105 of the user. In addition, the received usage frequencies 235 from other DPS 235 may be stored with and/or used with the usage frequencies 235 from the DPS 105.

The monitor module 405 may calculate 508 edit distance modifications for each word 230. The edit distance modifications may include common misspellings of each word 230. The monitor module 405 may include all words with an edit distance relative to a first word that is less than an edit distance threshold as instances of the first word 230. In one embodiment, instances of edit distance modifications for each word 230 are included in the usage frequency 235 for the word 230.

The identity module 410 may identify 510 a first word 230 in response to the usage frequency 235 for the first word 230 exceeding a use threshold. The use threshold may be an average daily use. In one embodiment, the use threshold is in the range of 2 to 8 uses per day. In an alternate embodiment, the use threshold is a total number of uses of the word 230. The use threshold may be in the range of 8 to 40 uses of the word 230.

In one embodiment, the identity module 410 identifies 510 the first word 230 during a background operation. For example, the identity module 410 may scan the usage frequency data base 210 and identify the first words 230 as having a usage frequency 235 that exceeds the use threshold when the DPS 105 is idle. Alternatively, the identity module 410 may identify 510 a first word 230 as the first word 230 is communicated as part of a communication 205. For example, the identity module 410 may identify 510 the first word 230 as the first word 230 is typed into a text message 205b.

In one embodiment, the first word 230 is identified 510 using a sub-dictionary 272 corresponding to the context of the communication 205. The identity module 410 may identify the first word 230 if the usage frequency 235 for the first word 230 exceeds the use threshold and if a portion of the word 230 is included in the sub-dictionary 272 for the context of the communication 205. For example, the context of a communication 205 may include the category of colleagues and the first word 230 may be "interspa." The identity module 410 may identify the first word as "interspatial" if the usage frequency 235 of "interspatial" exceeds the use threshold and if "interspatial" is included in the sub-dictionary 272 for colleagues.

The identity module 410 may insert 512 the first word 230 into text 220. For example, the first word 230 may be inserted 512 into a text message 205b, a viewed document 205e, or the like. In one embodiment, the insertion 512 of the first word 230 completes a spelling of the first word 230.

The identity module 410 may also add 514 the first word 230 to a dictionary 215 and the method 500 ends. The dictionary 215 may be a sub-dictionary 272 corresponding to the context of the communication 205. Alternatively, the dictionary 215 may be a personal dictionary 274. The first word 230 may subsequently be used in spell checking operations for the communications 205. Alternatively, the first word 230 may subsequently be used for spell checking operations for subsequent communications 205 with the same context as the context for the communications 205 from which the first word 230 was identified 510.

Figure 12:
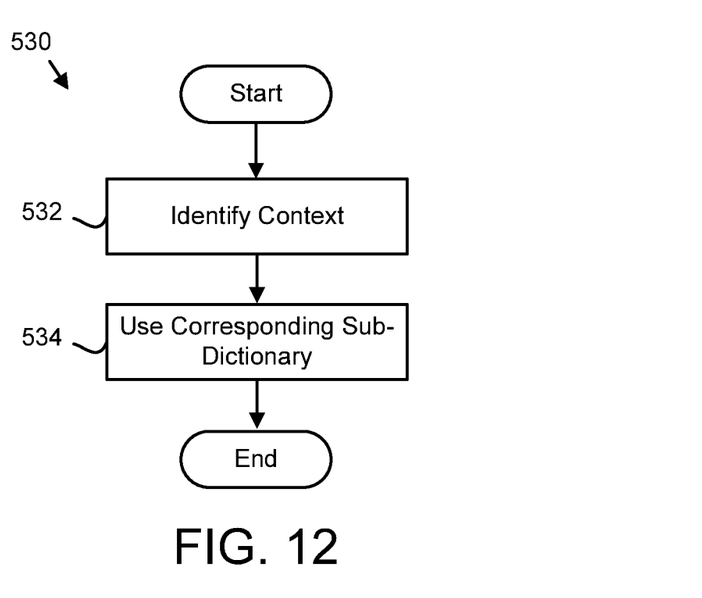
FIG. 12 is a schematic flow chart diagram illustrating one embodiment of a sub-dictionary use method.

FIG. 12 is a schematic flow chart diagram illustrating one embodiment of a sub-dictionary employment method 530. The method 530 may perform the functions of the system 100 and apparatus 400. In one embodiment, the method 530 is performed by use of the processor 305. Alternatively, the method 530 may be embodied in a program product comprising a computer readable storage medium storing machine readable code executed by the processor 305 to perform the functions of the method 530.

The method 530 starts, and in one embodiment the monitor module 405 identifies 532 a context for communication 205. The context may include at least one of the target audience 240, the subject 245, and the location 250 or combinations thereof as discussed previously. In one embodiment, the monitor module 405 further identifies the sub-directory 272 corresponding two to the context. In one embodiment, the sub-directory 272 comprises the same target audience 240, the same subject to 245, and the same location 250, or combinations thereof as the context of the communication 205. Alternatively, the monitor module 405 may select a sub-directory 272 that is a closest match for the context. For example, the monitor module 405 may select the sub-directory 272 with a greatest number of target audience elements, subject elements, and location elements matching the context.

The identity module 410 may use 534 the sub-dictionary 272 corresponding to the context and the method 530 ends. In one embodiment, the sub-dictionary 272 is used to complete an entry of a word into a communication 205. For example, the sub-dictionary 272 may identify a portion of the word 230 "encapsulate" such as "encaps" and complete the entry of the word 230 "encapsulate" into the communication 205. Alternatively, the identity module 410 may mandate the use of the sub-dictionary 272 corresponding to the context in spell checking the communication 205.

By determining the usage frequencies 235 of one or more words 230 in one or more contexts, the embodiments described herein may identify a first word 230 in response to the usage frequency 235 for the first word 230 exceeding a use threshold. The first word 230 may then be inserted into text 220 and or added to a dictionary 215. For example, the first word 230 "encapsulate" may be added so a sub-dictionary 272 corresponding to the target audience 240 of the group of colleagues. Alternatively, the first word 230 "encapsulate" may be added to a personal dictionary 274.

In addition, during a subsequent communication 205, the context of the communication 205 may be identified and a sub-dictionary 272 corresponding to the communication 205 may be employed. Thus the sub-dictionary 272 used for a specific communication 205 will be appropriate for the communication 205.

Embodiments may be practiced in other specific forms. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. An apparatus comprising:
   a memory that stores machine readable code;
   a processor that executes the machine readable code, the machine readable code comprising:
   a monitor module that monitors first communications and determines usage frequencies of a plurality of words in one or more contexts, the one or more contexts comprising a target audience, a subject, and a location and wherein a combination of the one or more contexts is independently associated with a sub-dictionary of a plurality of sub-dictionaries;
   an identity module that identifies a first word in response to a usage frequency for the first word in a first context combination of the one or more contexts exceeding a use threshold and adds the first word to a first sub-dictionary of the plurality of sub-dictionaries with a greatest number context elements matching the first context combination; and
   a display accessible by the processor.

2. The apparatus of claim 1, wherein the first communications comprise one or more of email, text messages, telephone conversations, video conversations, and viewed documents, wherein the video conversations are through the display.

3. A method comprising:
   monitoring, by use of a processor, first communications at a digital processing system;
   determining usage frequencies of a plurality of words in one or more contexts, the one or more contexts comprising a target audience, a subject, and a location and wherein a combination of the one or more contexts is independently associated with a sub-dictionary of a plurality of sub-dictionaries;
   identifying a first word in response to a usage frequency for the first word in a first context combination of the one or more contexts exceeding a use threshold; and
   adding the first word to a first sub-dictionary of the plurality of sub-dictionaries with a greatest number context elements matching the first context combination.

4. The method of claim 3, wherein the first word is added to the first sub-dictionary in response to a confirmation.

5. The method of claim 3, the method further comprising determining the one or more contexts.

6. The method of claim 5, further comprising:
   identifying a second context for second communications; and
   using a second sub-dictionary associated with the second context in the second communications.

7. The method of claim 3, wherein the first communications comprise one or more of email, text messages, telephone conversations, video conversations, and viewed documents.

8. The method of claim 3, wherein the plurality of words comprise editing distance modifications of monitored words.

9. A program product comprising a non-transitory computer readable storage medium storing machine readable code executed by a processor to perform the operations of:
   monitoring first communications at a digital processing system;
   determining usage frequencies of a plurality of words in one or more contexts, the one or more contexts comprising a target audience, a subject, and a location and wherein a combination of the one or more contexts is independently associated with a sub-dictionary of a plurality of sub-dictionaries;
   identifying a first word in response to a usage frequency for the first word in a first context combination of the one or more contexts exceeding a use threshold; and
   adding the first word to a first sub-dictionary of the plurality of sub-dictionaries with a greatest number context elements matching the first context combination.

10. The program product of claim 9, wherein the usage frequencies for the plurality of words are determined for the one or more contexts.

11. The program product of claim 9, wherein the first communications comprise one or more of email, text messages, telephone conversations, video conversations, and viewed documents.

* * * * *